US005679277A

United States Patent [19]

Niibe et al.

[11] Patent Number: 5,679,277

[45] Date of Patent: Oct. 21, 1997

[54] FLAME-RESISTANT HEATING BODY AND METHOD FOR MAKING SAME

[76] Inventors: Akitoshi Niibe, Kamisu 3-7 29, Kamisu-cho, Kashima-gun, Ibaragi-ken; Kinichi Nakagawa, 1532 Koike-cho, Hamamatsu-City, Shizuoka-Pref, both of Japan

[21] Appl. No.: 398,962

[22] Filed: Mar. 2, 1995

[51] Int. Cl.$^{6}$ .............................. H05B 3/16; H05B 3/34; C09K 21/00; B23K 13/08

[52] U.S. Cl. .......................... 219/543; 219/545; 219/482; 252/601

[58] Field of Search .................................... 219/211, 212, 219/213, 527, 528, 529, 543, 545, 501, 482, 497; 252/601, 608, 609, 500, 502

[56] References Cited

U.S. PATENT DOCUMENTS

| | | | |
|---|---|---|---|
| Re. 29,630 | 5/1978 | May | 5/345 |
| 3,721,799 | 3/1973 | Carlstrom | 219/212 |
| 3,781,526 | 12/1973 | Damron | 219/549 |
| 3,808,403 | 4/1974 | Kanaya et al. | 219/212 |
| 3,936,661 | 2/1976 | Furuishi et al. | 219/528 |
| 4,149,066 | 4/1979 | Niibe | 219/212 |
| 4,184,969 | 1/1980 | Bhat | 252/601 |
| 4,251,718 | 2/1981 | Cole | 219/505 |
| 4,377,506 | 3/1983 | Sprague | 252/609 |
| 4,421,993 | 12/1983 | Bloomer | 219/497 |
| 4,450,496 | 5/1984 | Doljack et al. | 219/212 |
| 4,480,894 | 11/1984 | Miller et al. | 350/167 |
| 4,547,311 | 10/1985 | Sako et al. | 252/511 |
| 4,696,830 | 9/1987 | Obayashi et al. | 427/41 |
| 4,987,026 | 1/1991 | Jacobs et al. | 428/246 |
| 5,091,243 | 2/1992 | Tolbert et al. | 428/253 |
| 5,126,000 | 6/1992 | Takai et al. | 219/549 |
| 5,151,578 | 9/1992 | Phillips | 219/549 |
| 5,233,821 | 8/1993 | Weber, Jr. et al. | 57/224 |
| 5,279,878 | 1/1994 | Föttinger | 428/102 |
| 5,403,992 | 4/1995 | Cole | 219/212 |
| 5,422,462 | 6/1995 | Kishimoto | 219/545 |

OTHER PUBLICATIONS

Fisher, L.E., The Weavers, Franklin Watts Inc., New York, pp. 30–43.

*Primary Examiner*—Teresa J. Walberg
*Assistant Examiner*—Sam Paik
*Attorney, Agent, or Firm*—Morrison Law Firm

[57] ABSTRACT

A heating body includes a layered structure consisting of a resistive body and a control body, with a meltable insulating sheet therebetween. The control body contains wires which are brought into electrical contact with the resistive body if the temperature of the resistive body exceeds the melting temperature of the insulating sheet. Current flow between the resistive body and the control body is detected to trigger a power cutoff to the resistive body. The material of the insulating sheet is selected to have a melting point well below an ignition temperature of the materials in the heating body, thereby triggering power cutoff at temperatures low enough to prevent fire. A control system normally controls the temperature of the heating body between an upper and a lower limit.

5 Claims, 2 Drawing Sheets

FLAME-RESISTANT HEATING BODY AND METHOD FOR MAKING SAME

BACKGROUND OF THE INVENTION

The present invention relates to heaters for use in beds and floors. More particularly, the present invention relates to a time-resistant heaters which generate heat in a seclusive or confined location.

Conventional methods for generating heat using heaters with heating elements that generate heat as a result of electric current passing through an electrical resistance. These include heating elements made of a NICHROME (a Ni-Cr alloy) wire which is arrayed in a repeated sigmoid pattern, and those made of printed metal foils. High energy consumption costs and safety and endurance problems are numerous among these known disclosures.

It is also known to form heat-generating bodies by forming a film plate from silicon resin containing carbon particles. The carbon particles are suspended in a liquid for mixing with the silicon resin. The resulting mixture is cured and dried to form the finished heat-generating body. It is similarly known that heat-generating bodies can be made by coating carbon on chemical and glass fibers. A liquid vehicle is commonly used for applying the carbon particles in this coating process. A drawback with these technologies is that the distribution of carbon particles, and the resulting temperature distribution throughout the devices is uneven. Also, such devices may be damaged when they are folded or subjected to strain or load. These problems limit the commercial applications of such of heaters.

U.S. Pat. No. 3,721,799, for example, discloses an electric heating source in which resistance wires are interwoven with conducting wires. However, no specific use of seclusive or confined heating is disclosed. In addition, flame resistant materials are not disclosed in conjunction with the heating element.

Likewise, U.S. Pat. No. 3,936,661 combines an electric heater with a thermoplastic plate to form a leveling pad. The plate is heated while bearing a load. The heat softens the thermoplastic plate, thereby permitting it to deform under the load. When the heating is terminated, the final thickness of the plate maintains the load in a levelled condition. Flame resistance properties are contemplated for this disclosure. Flame resistance is enhanced by the inclusion of a random copolymer including an aromatic dicarboxylic acid. The patent suggests, however, the need for further addition of fire proofing agents to procure higher flame-resistance values.

Fire-retardant fabrics are also well known in the prior art. For example, the fire-resistant fabric disclosed in U.S. Reissue Pat. No. 29,630 resists cigarette burns. This patented article uses textiles, a polymeric binder and metal mesh—yet no disclosure for use in conjunction with heating elements is made.

A fire barrier fabric is disclosed in U.S. Pat. No. 5,091,243 having an intumescent compound which swells to form a char plugging the interstices of incorporated corespun yarns. The flame resistant core is covered by a sheath of staple fibers, with the intumescent coating carried on only one surface of the textile fabric. No use with inner heating portions is disclosed in this patent.

U.S. Pat. No. 5,233,821 discloses flame-resistant and cut-resistant fabrics. Flame-resistant and cut-resistant properties are derived from the composition of the fabric which is disclosed as containing polybenzazole polymers. No use with heating portions is disclosed in this patent.

U.S. Pat. No. 5,279,878 discloses a flame barrier structure of non-woven partially graphitized polyacrylonitrile fibers. It discloses that the flame barrier can be used as a component of a planar multi-layer structure, but does not disclose a use as a heating body.

U.S. Pat. No. 5,151,578 discloses a sealed, electrically resistive element that converts electrical energy to heat. This device is designed to resist bending in a vertical direction while permitting horizontal bending. Generation of seclusive or confined heat is not controlled relative to the surface of the device according to this disclosure.

Recently it has been shown that a heat-generating body can be made of carbon-coated cotton fabrics. However, among conventional disclosures, the homogeneity of the composition of the carbon coating material is lacking. Similarly, known carbon-coated cotton fabrics are plagued by high material loss during manufacturing and costs are prohibitive. Also, there are problems relating to thermal deterioration during usage over extended periods of time.

Unsuccessful attempts have also been made to address a longstanding problem of protecting a heat generating body by means of a flame resistant material. Indeed, the prior art appears to be devoid of any teaching suggesting the use of heat-generating bodies encompassed by an entirely flame-resistant structure.

Carbon-coated cotton fabric used as a heating body is known for its endurance properties. However, thermal deterioration of the carbon liquid used in the coating creates a risk of electrical problems and fire when the heating body is used over extended periods of time.

Likewise, problems relating to thermal deterioration during long term usage have not been overcome by attempts at control mechanisms to adjust and control the heat generating surface to prevent safety problems.

OBJECTS AND SUMMARY OF THE INVENTION

It is an object of the present invention to provide a time-resistant heating body which overcomes the drawbacks of the prior art.

A further object of the present invention is to provide a flame-resistant controlled heating body which provides uniform temperature distribution at low cost.

A further object of the present invention is to provide a thermally strong and durable time-resistant controlled heating body.

A still further object of the present invention is to provide a flame-resistant controlled heating body with a control body and a time-resistant polyvinyl chloride sheet which is completely flame-resistant and safe.

A further object of the present invention is to provide a method for producing the flame-resistant controlled heating body.

A further object of the present invention is to provide a time-resistant controlled heating body capable of providing confined heat in a cost effective manner.

Further objects of the present invention are to provide a method for producing a carbon-containing coating and for producing a nonflammable coating.

The present invention seeks to solve these problems by creating a layered structure to enclose a carbon-coated heating body. The bottom layer of the layered structure includes a flame resistant sheet exemplified by an insulating polyvinyl chloride sheet. The center layer is the heating body. The top layer is an insulating sheet, such as a polyvinyl chloride sheet. By forming a one-piece structure from these layers, the resulting layered structure is capable of insulating the heat generated by the carbon-coated heating body while, at the same time, is characterized as having flame resistant properties in case of fire.

Briefly stated, there is provided a heating body which includes a layered structure consisting of a resistive body and a control body, with a meltable insulating sheet therebetween. The control body contains wires which are brought into electrical contact with the resistive body if the temperature of the resistive body exceeds the melting temperature of the insulating sheet. Current flow between the resistive body and the control body is detected to trigger a power cutoff to the resistive body. The material of the insulating sheet is selected to have a melting point well below an ignition temperature of the materials in the heating body, thereby triggering power cutoff at temperatures low enough to prevent fire. A control system normally controls the temperature of the heating body between an upper and a lower limit.

According to an embodiment of the invention, there is provided a heating body which includes a resistive body, a flame-resistant sheet and an insulating sheet. The resistive body is inter-imposed between the flame resistant sheet and the insulating sheet. The flame resistant sheet, resistive body, and insulating sheet forms a layered structure. The heating body further includes a control body attached on an upper surface of the layered structure, at least one heat-sensing wire attached to a lower surface of the layered structure, a means for connecting a power source to the resistive body, a means for connecting the power source to the heat-sensing wire, and a means for controlling the power applied to the heating body.

According to another embodiment of the present invention, there is provided a method of depositing a carbon-containing coating on a fabric which includes preparing a carbon-containing liquid by mixing from about 10 to about 15 wt. % of graphite powder, together with from about 10 to about 15 wt. % of a polyurethane based binder, and from about 70 to about 80 wt. % of 1,3-dioxolane. This is followed by immersing the fabric in the carbon-containing liquid and drying at a temperature ranging from about 170° C. to about 200° C.

According to another embodiment of the present invention, there is a method of depositing a carbon-containing coating on a fabric which includes the fabric formed by satin weaving and twilling.

According to another embodiment of the present invention, there is provided a method of depositing a carbon-containing coating on a fabric which includes preparing a carbon-containing liquid by mixing from about 10 to about 15 wt. % of carbon powder, together with from about 10 to about 15 wt. % of a polyurethane based binder, and from about 70 to about 80 wt. % of 1,3-dioxolane, followed by immersing the fabric in the carbon-containing liquid, and then drying at a temperature ranging from about 170° C. to about 200° C.

According to another embodiment of the present invention, there is provided a method of depositing a carbon-containing coating on a fabric which includes preparing a carbon-containing liquid by mixing from about 10 to about 15 wt. % of carbon powder, together with from about 10 to about 15 wt. % of a polyurethane based binder, and from about 70 to about 80 wt. % of 1,3-dioxolane. Accordingly, the carbon powder component includes about 3 to about 4.5 wt % of natural carbon powder and about 7 to about 10.5 wt % of graphite total contribution to the overall carbon-containing liquid. The preparation of the carbon-containing liquid is followed by immersing the fabric in the carbon-containing liquid, and then drying at a temperature ranging from about 170° C. to about 200° C.

According to another embodiment of the present invention, there is provided a method of depositing non-flammable coating on a fabric which includes preparing a nonflammable liquid by mixing from about 80 to about 88 wt. % of water ($H_2O$), together with from about 1 to about 2 wt. % of sodium borate ($Na_2B_4O_7$) powder, from about 1 to about 3 wt. % of boric acid ($H_3BO_3$, and from about 10 to about 15 wt. % of ammonium sulfamine ($NH_4OSO_2NH_2$). Thereafter, the fabric is immersed in the nonflammable liquid and dried.

According to another embodiment of the invention, there is provided a method of producing a heating body which includes interposing a resistive body between a flame-resistant sheet and an insulating sheet, wherein the insulating sheet forms a top surface. Thereafter the resistive body, the flame-resistant sheet and the insulating sheet are laminated. A control body is affixed to the top surface.

According to another embodiment, there is provided an emergency shut-off system for a heating body which includes the heating body including a resistive body, an insulating sheet affixed to the resistive body and a control body affixed over the insulating sheet. The control body contains electrical conductors. The insulating sheet has a melting point below an ignition temperature of materials in the heating body. The insulating sheet, when melted, permits electrical contact between the resistive body and the control body. The heating body has a means for sensing the electrical contact and a means, responsive to the means for sensing, for cutting off power to the resistive body.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
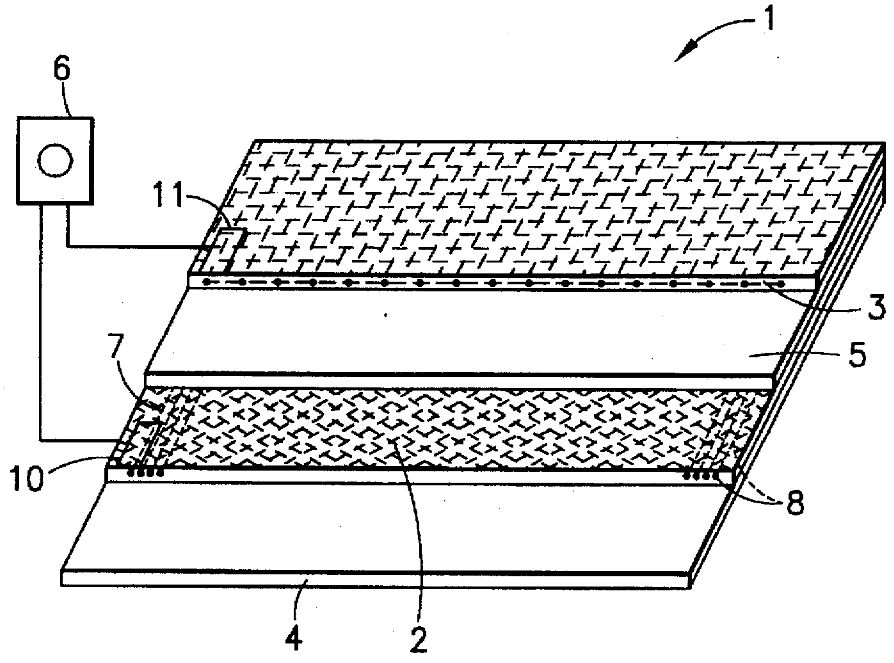
FIG. 1 is a perspective view of a flame-resistant controlled heating body according to an embodiment of the present invention.

Referring to FIG. 1, a flame resistant controlled heating body, shown generally at 1, includes a flame resistant sheet 4 on which is affixed a resistive body 2. An insulating sheet 5 is affixed over an upper surface of resistive body 2. A control body 3 is affixed over insulating sheet 5. An electrode terminal 10, on resistive body 2 is connected to a first terminal of a controller 6. A control terminal 11, on control body 3 is connected to a second terminal of controller 6.

Control body 3 is part of an emergency shutdown system for preventing overheating, and possible fire, to be described later.

A layered structure is formed by placing resistive body 2 between flame-resistant sheet 4 and insulating sheet 5. After the structure is laid, it is bonded together under vacuum by thermal fusion or lamination to form a one-piece structure. Control body 3 is added over insulating sheet 5 using, for example, an adhesive glue.

Resistive body 2 resists damage due to bending and stress. The base fabric of resistive body 2 a twilled fabric woven from pure cotton yarn. An electrode wire 7 is deposited along one end of resistive body 2. Electrode wire 7 is in contact with electrode terminal 10. A metal wire 8 is deposited at the opposed end of resistive body 2, parallel to electrode wire 7. Electrode wire 7 and metal wire 8 may each be a single wire, but each is preferably a plurality of parallel wires. Although not shown, a wire is connected from controller 6 to metal wire 8.

Electrode wires 7 and metal wires 8 are integrally woven into the base fabric by substituting metal for cotton yarn at periodic intervals. Preferably, the cotton should be omitted, and metal substituted in a ratio of from about 1:1 to about 1:4.

A carbon-containing liquid is deposited on the base fabric of resistive body 2. The liquid is dried to form resistive body 2. The presence of electrode wire 7, at one end of resistive body 2, and metal wire 8 at the opposed end of resistive body 2, permits the passage of an electric current through the carbon on resistive body 2, and the consequent generation of heat.

A power source (not shown) is connected through electrode terminal 10 to electrode wire 7 in resistive body 2. The carbon-containing liquid is deposited over electrode wire 7 during the coating of resistive body 2, and thus effects electrical connection therebetween. Electrode terminal 10 is preferably a conductive coating deposited in contact with electrode wire 7. A lead wire is affixed to electrode terminal 10 by any convenient means such as, for example, by soldering.

Similarly, control terminal 11 is connected to a metal wire 8 (see FIG. 2) also installed in control body 3. Control terminal 11 is connected to controller 6 by a wire.

Figure 2:
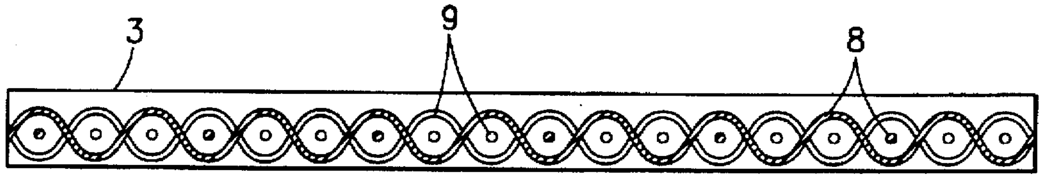
FIG. 2 is a cross-section view of a control body according to an embodiment of the present invention.

Referring to FIG. 2, control body 3 includes substantially pure plain weave cotton yarn 9 interwoven with metal wires 8 in both vertical and horizontal directions spaced about 2 to about 5 cm apart during formation of the cotton fabric to form a control fabric structure or mesh. Control body 3 is made nonflammable by coating with a flame retardant liquid.

Figure 3:
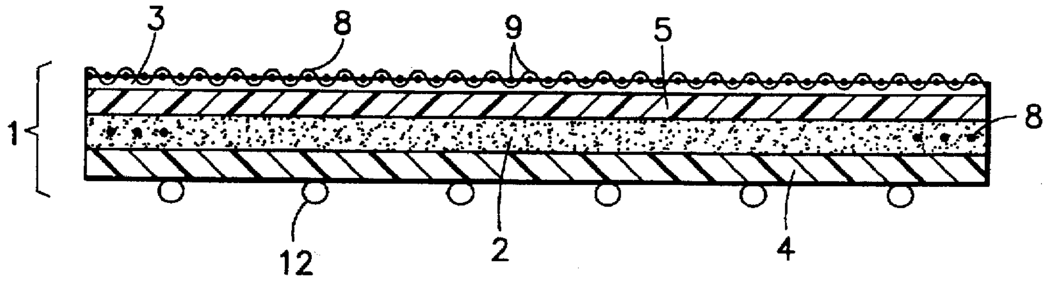
FIG. 3 is a cross-section view of a flame-resistant controlled heating body according to an embodiment of the present invention.

Referring now to FIG. 3, insulating sheet 5 is located between resistive body 2 and control body 3. The material of insulating sheet material is selected for a suitable melting temperature. Preferably, insulating sheet 5 is a conventional polyvinyl chloride which has a melting point of from about 200° to about 300° C. The ignition temperature of cotton is very much higher than this range.

When insulating sheet 5 is subjected to temperatures exceeding its melting point, such as may be caused by the deterioration of the carbon in resistive body 2 or by an electrical problem, the melting of insulating sheet 5 removes the electrical insulation previously existing between resistive body 2 and control body 3. This permits a leakage current to flow between resistive body 2 and the mesh of thin metal wires 8 of control body 3. Controller 6 senses this leakage current and shuts off power to resistive body 2. This control technique ensures that the temperature of resistive body 2 is prevented from reaching a level capable of igniting a flame in resistive body 2 or control body 3.

Heat-sensing wires 12 are installed on the lower surface of flame-resistant sheet 4. Heat-sensing wires 12, shown in cross section, are preferably a single wire disposed in a sigmoid pattern with a spacing between runs of, for example, about 10–50 centimeters. Heat-sensing wires 12 are preferably made of a material having a substantial temperature coefficient of resistance, such that a current therethrough is variable in dependence on their temperature. One suitable material is copper. Heat-sensing wires 12 are part of a thermostatic control system, and an emergency shutdown system in the case of overtemperature, as will be described.

Figure 4:
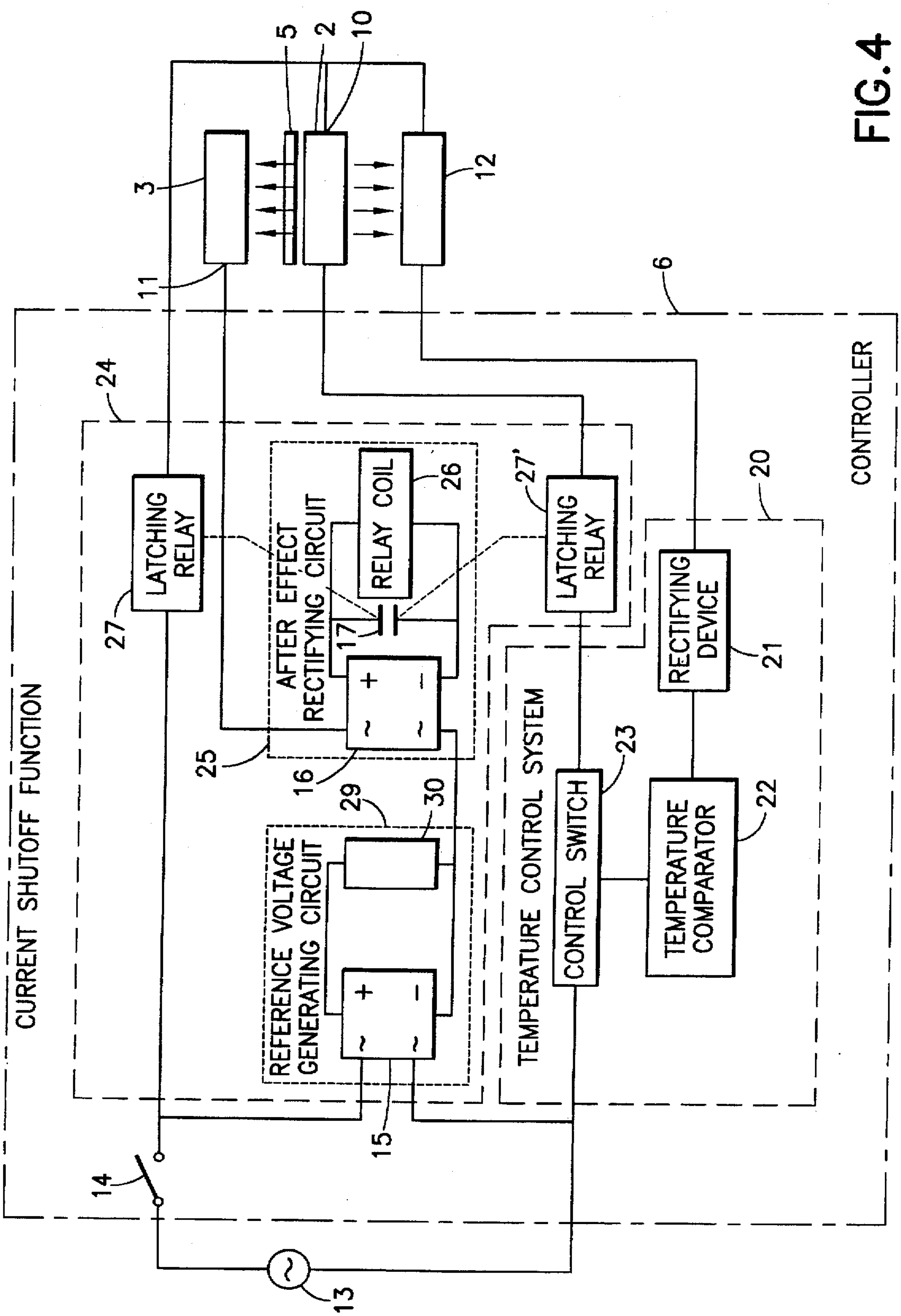
FIG. 4 is a block diagram of a electrical panel of the flame-resistant controlled heating body.

Referring to FIG. 4, one terminal of an AC power source 13 is connected through an ON/OFF switch 14 to inputs of a reference voltage generator 29 and a latching relay 27. An output of latching relay 27 is connected to electrode terminal 10 and to one terminal of heat-sensing wire 12. The second terminal of AC power source 13 is connected to a second input of reference voltage generating circuit 29, and to an input of a temperature control system 20.

Reference voltage generating circuit 29 contains a rectifier 15 and a voltage regulator 30. A voltage-regulated output of reference voltage generating circuit 29 is applied to an input of an after effect rectifying circuit 25. An output of control terminal 11 of control body 3 is connected to a second input of after effect rectifying circuit 25.

Insulating sheet 5, between resistive body 2 and control body 3 normally prevents the flow of leakage current therebetween.

After effect rectifying circuit 25 contains a rectifier and comparator 16 receiving the regulated reference voltage from reference voltage generating circuit 29 at one of its inputs, and the output of control body 3 at its other input. Outputs of rectifier and comparator 16 are connected in parallel to a relay coil 26, and holding contacts 17 of relay coil 26.

Temperature control system 20 contains a control switch 23, receiving the output of power source 13 at one of its inputs. An output of control switch 23 is connected to an input of a latching relay 27'. The output of latching relay 27' is connected to the second terminal of resistive body 2. A rectifying device 21 receives its input from heat-sensing wire 12. An output of rectifying device 21 is connected to a second input of a temperature comparator 22. The output of temperature comparator 22 is applied as a control input to control switch 23.

A mechanical connection from normally open holding contacts 17 of relay coil 26 and the normally closed contacts of latching relays 27 and 27', ensures concerted actuation of all three sets of relay contacts.

In normal operation, the contacts of latching relays 27 and 27' are closed. When ON/OFF switch 14 is closed, power to resistive body 2 and heat-sensing wire 12 is controlled by control switch 23. Rectifying device 21 responds to temperature-dependent changes in voltage and/or current produced by the temperature sensed by heat-sensing wire 12 to apply a temperature-dependent voltage to temperature comparator 22.

Temperature comparator 22 applies an energizing signal to control switch 23 when the temperature sensed by heat-sensing wire 12 is below a first setpoint. This closes control switch 23 and applies power therethrough, and through latching relay 27' to resistive body 2, thereby enabling the generation of heat in resistive body 2. When the sensed temperature exceeds a second setpoint, temperature comparator 22 removes the energizing signal from control switch 23, thereby temporarily ending the heating cycle. When the sensed temperature again fails below the first setpoint, heating is resumed.

The first and second setpoints may be user controlled in a safe range of temperature. For example, the user may select a setpoint range between 50 and 60 degrees C. A built-in upper limit on sensed temperature of, for example, 80 degrees C, may be included in temperature comparator which the sensed temperature is not permitted to exceed, regardless of user setting. This upper limit is especially useful in the event that heating body 1 is placed in a confined, and thermally insulating environment such as, for example, under a blanket or pillow.

In the event of failure of temperature control system 20 to maintain a safe temperature over the entire area of resistive body 2, current shutoff function 24, together with control body 3, permanently disable heating body 1. One type of failure contemplated includes failure of control switch 23 in the ON condition. This causes uncontrolled heating in resistive body 2. When any part of resistive body 2 exceeds the melting temperature of insulating sheet 5, electrical contact is established between conductors in resistive body 2 and the metal wires 8 (see FIG. 2) in control body 3. The resulting leakage current and/or voltage received in control body 3 is applied to the input of rectifier and comparator 16 in after effect rectifying circuit 25.

In response to the leakage current from control body 3, rectifier and comparator 16 applies an energizing signal across the terminals of relay coil 26. Relay coil 26 thereupon opens the normally closed contacts of latching relays 27 and 27', and closes holding contacts 17. Holding contacts 17 maintain energizing voltage on relay coil 26, even if the original energizing signal is removed. The opening of latching relays 27 and 27' cuts off power to both ends of resistive body 2, thereby ensuring cessation of heating.

The melting point of insulating material in insulating sheet 5 determines the temperature at which current shutoff function 24 is actuated to remove power from resistive body 2. A suitable choice of materials may provide a melting temperature of, for example, from about 200 to about 250 degrees C. Some applications may benefit from a lower temperature range of, for example, 100 to 150 degrees, or higher limits, so long as safety considerations are satisfied.

A second failure mode may include breakdown of the carbon layer on resistive body 2, or other failure, which produces a localized high temperature which may not be sensed by heat-sensing wire 12, since heat-sensing wire 12 senses the average temperature over the entire surface of resistive body 2. However, even localized high temperature is capable of melting the material of insulating sheet 5 and triggering the cutoff function.

The carbon-containing liquid deposited on the base fabric of resistive body 2 includes a mixture of carbon, a polyurethane based binder and 1,3-dioxolane. From about 10 to 15 wt % of carbon powder is mixed with about 10 to 15 wt % polyurathane based binder, with the balance, ranging from about 70 to about 80 wt % 1,3 dioxolane.

The carbon powder is a mixture of natural carbon powder and graphite. The proportions of each in the total liquid is from about 3 to about 5 wt % of natural carbon powder and from about 7 to about 10 wt % of graphite.

The method of forming resistive body 2 includes forming a base fabric from cotton yarns by twilling or satin weaving a plurality of twisted thin metal wires 8, as electrodes, with the cotton yarns at two ends of the cotton fabric. The base fabric is then immersed in the carbon-containing liquid. The carbon-containing liquid, as described above, is formed by mixing graphite, natural carbon powder, polyurethane based binder, and 1,3-dioxolane. The coated base fabric is then dried at a temperature range of from 170° C. to about 200° C.

In the above embodiment, the carbon powder includes from about 3.8 to about 5.7 wt. % natural carbon powder and about 6.2 to about 9.3 wt. % graphite powder. Upon drying, the deposited carbon powder includes about 38 to about 39 dry wt. % natural carbon powder and about 61 to about 62 dry wt. % graphite powder.

The non-flammable liquid coating deposited on control body 3 is prepared by mixing from about 80 to about 88 wt % water ($H_2O$) at a temperature of from 30° C. to about 50° C., with about 1 to about 2 wt % sodium borate ($Na_2B_4O_7$) powder, about 1 to about 3 wt % boric acid ($H_3BO_3$), and about 10 to about 15 wt % ammonium sulfamine ($NH_4OSO_2NH_2$).

The method of forming control body 3 includes plain weaving cotton yarns to form a cotton fabric, while incorporating a network of vertical and horizontal twisted thin metal wires 8 into the cotton fabric during weaving. The vertical and horizontal wires 8 cross each other, thereby providing electrical connection between all wires 8. The base fabric is then made nonflammable by coating with the above time retardant non-flammable liquid of water ($H_2O$), sodium borate ($Na_2B_4O_7$) powder, boric acid ($H_3BO_3$, and ammonium sulfamine ($NH_4OSO_2NH_2$) by immersion. The coated base fabric is then dried at a temperature sufficient to remove the water.

Insulating sheet 5 may include conventional polyvinyl chloride which has a melting point of from about 200° to about 300° C. The method of forming flame-resistant polyvinyl chloride insulating sheet 5 includes forming a polyvinyl chloride composition containing from about 54 wt % polyvinyl chloride, about 20 wt % heat resistant plasticizer such as dioctyl phthalate (DOP), about 1.5 wt % flame-retardant insulating agent, and about 2 wt % of colorant. An orange colored colorant is preferred because orange is least likely to discolor under high heat.

About 10 wt % of the above non-flammable liquid formed of water ($H_2O$), sodium borate ($Na_2B_4O_7$) powder, boric acid ($H_3BO_3$, and ammonium sulfamine ($NH_4OSO_2NH_2$) is mixed with about 90% by weight of the polyvinyl chloride composition. A sheet is then formed from the polyvinyl chloride/nonflammable liquid mixture.

The polyvinyl composition includes, by weight percent, about 54 percent polyvinyl chloride, about 20 percent heat resistant plasticizer such as DOP, about 1.5 percent stabilizer, about 12.5 percent flame-retardant insulating agent, and about 2 percent colorant.

In sum, heating body 1 of the present invention exhibits superior flame resistant properties during long-term usage compared to conventional heaters. The superior time resistant properties are imparted by resistive body 2, while the inherent safety features are provided by the current shutoff function 24 of control body 3.

Moreover, the heat generated by the heating body 1 does not pose a threat to mammals, including humans, in that the heat generated is confined and can be maintained at a comfortable temperature without the threat of burning, or excessive heating over small areas.

Indeed heating body 1 will find widespread use as a heating device in the medical arts. Essentially, heat generated by carbon based heating body 1, falls within the far infra red region, i.e., wavelength 5 to 15 microns. As such, it is easily absorbed by mammals including humans without the threat of burning.

Having described preferred embodiments of the invention, it is to be understood that the invention is not limited to those precise embodiments, and that various changes and modifications may be effected therein by one skilled in the art without departing from the scope or spirit of the invention as defined in the appended claims.

What is claimed is:

1. A heating body comprising:

a resistive body;

a flame-resistant sheet;

an insulating sheet;

said resistive body being inter-imposed between said flame resistant sheet and said insulating sheet;

said flame resistant sheet, resistive body, and insulating sheet forming a layered structure;

a control body on an upper surface of said layered structure;

at least one heat-sensing wire attached to a lower surface of said layered structure;

means for connecting a power source to said resistive body;

means for connecting said power source to said heat-sensing wire; and means for controlling a power applied by said power source to said heating body;

said flame-resistant sheet includes a polyvinyl chloride composition and a nonflammable material; and said nonflammable material includes, by weight percent:

from 80 to 88 percent water ($H_2O$);

from 1 to 2 percent sodium borate ($Na_2B_4O_7$) powder;

from 1 to 3 percent boric acid ($H_3BO_3$); and from 10 to 15 percent ammonium sulfamine ($NH_4OSO_2NH_2$).

2. A heating body comprising:

a resistive body;

a flame-resistant sheet;

an insulating sheet;

said resistive body being inter-imposed between said flame resistant sheet and said insulating sheet;

said flame resistant sheet, resistive body,, and insulating sheet forming a layered structure;

a control body on an upper surface of said layered structure;

at least one heat-sensing wire attached to a lower surface of said layered structure;

means for connecting a power source to said resistive body;

means for connecting said power source to said heat-sensing wire; and means for controlling a power applied by said power source to said heating body;

said control body includes:

a control fabric structure including cotton fabric and a plurality of metal wires, wherein said metal wires are combined with said cotton fabric by vertically and horizontally weaving said metal wires spaced during formation of said cotton fabric; and said control fabric structure contains a nonflammable material.

3. The heating body of claim 2, wherein said nonflammable material includes, by weight percent:

from 80 to 88 percent water ($H_2O$);

from 1 to 2 percent sodium borate ($Na_2B_4O_7$) powder;

from 1 to 3 percent boric acid ($H_3BO_3$); and from 10 to 15 percent ammonium sulfamine ($NH_4OSO_2NH_2$).

4. A heating body comprising:

a resistive body;

a flame-resistant sheet;

an insulating sheet;

said resistive body being inter-imposed between said flame resistant sheet and said insulating sheet;

said flame resistant sheet, resistive body, and insulating sheet forming a layered structure;

a control body on an upper surface of said layered structure;

at least one heat-sensing wire attached to a lower surface of said layered structure;

means for connecting a power source to said resistive body;

means for connecting said power source to said heat-sensing wire; and means for controlling a power applied by said power source to said heating body;

said means for controlling power comprises:

a temperature control system; and means for shutting Off a current flowing between said power source and said heating body;

said means for shutting off said current comprises:

an after effect rectifying circuit having means for rectifying and a relay coil;

said relay coil being in an open position and having holding contacts for holding a closed position;

said rectifying means receiving an input of leaked current from said control body;

a first latching relay connected between said output of said control switch and said resistive body;

said first latching relay having a closed position during operation of said power source and having an open position during a shutoff condition;

means for connecting said first latching relay to said resistive body; a second latching relay, connected between said power source and said resistive body and said heat-sensing wires;

said second latching relay having a closed position during operation of said power source and having an open position during a shutoff condition;

said relay coil being mechanically connected to said first and second latching relays;

a reference voltage generating circuit;

said reference voltage generating circuit receiving an input from said power source and producing a voltage-regulated output;

said voltage-regulated output being applied to said after effect rectifying circuit thereby producing a rectified output;

a control terminal having first and second inputs;

said first input receiving said rectified output from said after effect rectifying circuit; and said second input receiving said input of leaked current from said control body, whereby a presence of said leaked current from said control body closes said relay coil holding contacts, thereby moving said first and second latching relays to said open positions, whereby said input of leaked current from said control body along with said voltage-regulated output produce a signal to said rectifying means to apply an energizing signal across said relay coil whereby said relay coil closes said holding contacts and signals to said first and second latching relays to said respective open positions to shut off power to said resistive body.

5. A method of depositing nonflammable coating on a fabric comprising:

preparing a nonflammable liquid by mixing from about 80 to about 88 wt. % of water ($H_2O$), together with from about 1 to about 2 wt. % of sodium borate ($Na_2B_4O_7$) powder, from about 1 to about 3 wt. % of boric acid ($H_3BO_3$, and from about 10 to about 15 wt. % of ammonium sulfamine ($NH_4OSO_2NH_2$);

immersing said fabric in said nonflammable liquid; and drying.

* * * * *